United States Patent [19]

Sudler et al.

[11] 4,267,472

[45] May 12, 1981

[54] SINGLE PHASE STEPPING MOTOR, PARTICULARLY FOR CLOCKS

[75] Inventors: Roland Sudler, Frankfurt am Main; Jean-Francois Schwab, Schwalbach, both of Fed. Rep. of Germany

[73] Assignee: Quarz-Zeit AG, Frankfurt am Main, Fed. Rep. of Germany

[21] Appl. No.: 935,662

[22] Filed: Aug. 21, 1978

[30] Foreign Application Priority Data

Aug. 25, 1977 [DE] Fed. Rep. of Germany ....... 2738299

[51] Int. Cl.³ ............................................. H02K 37/00
[52] U.S. Cl. .................................. 310/49 R; 310/156; 310/162
[58] Field of Search ................. 310/49, 162, 165, 156

[56] References Cited

U.S. PATENT DOCUMENTS 2,546,729  3/1951  DeMillar .......................... 310/49 X

*Primary Examiner*—Donovan F. Duggan
*Attorney, Agent, or Firm*—Martin A. Farber

[57] ABSTRACT

A single phase stepping motor, particularly for clocks, having a disc-like axially magnetized rotor with a number of rotor poles and a stator, which stator is made of at least two stator parts connected with one another via a bridge part carrying the excitation winding. Each stator part on its free end has a smaller number (in comparison to the number of rotor poles) of stator poles, the latter being directed toward the face side of the rotor. In the rest condition of the rotor, a rotor pole with its main part is disposed in the range of a stator pole and with an edge part in the range of the following stator pole.

3 Claims, 4 Drawing Figures

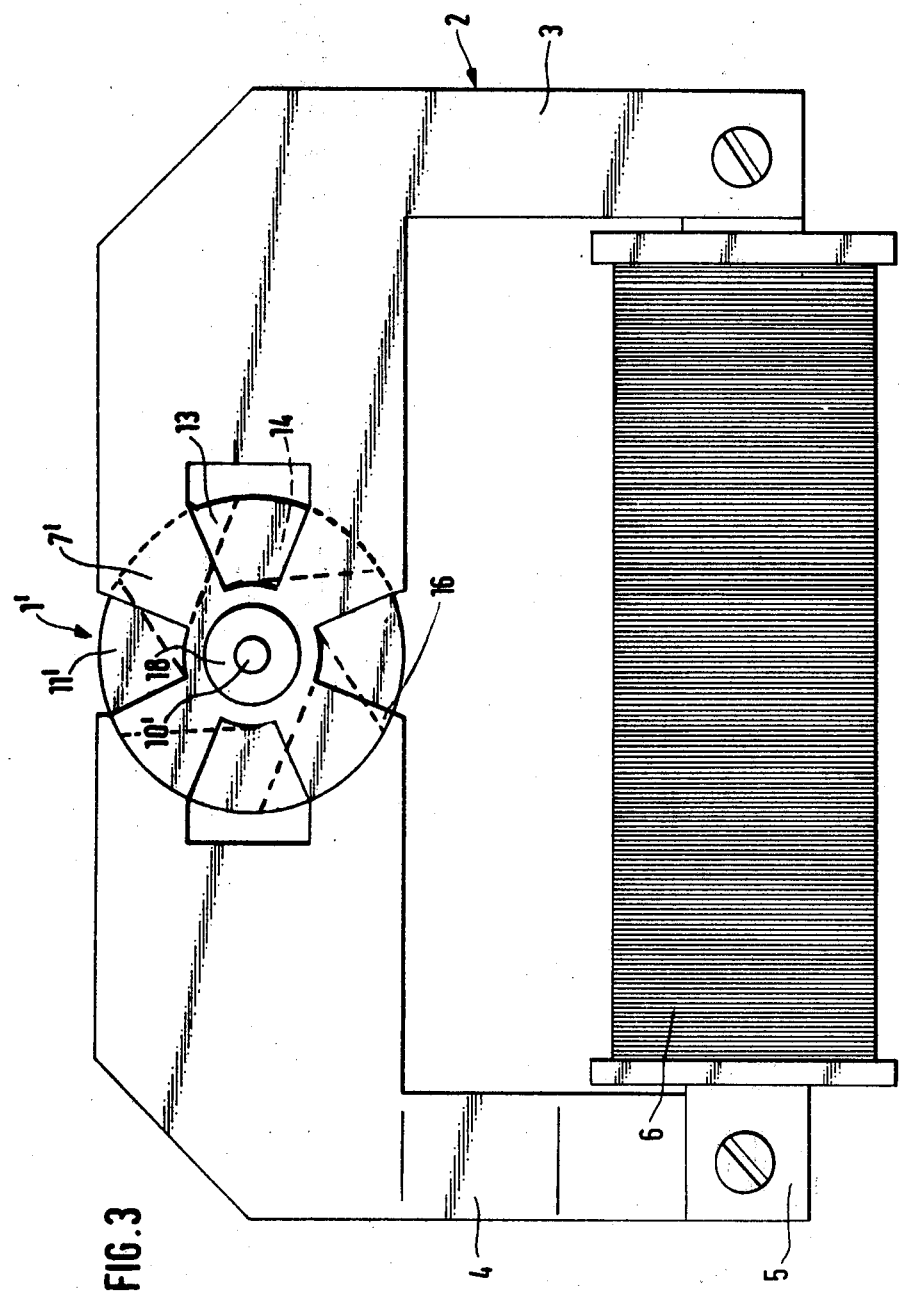

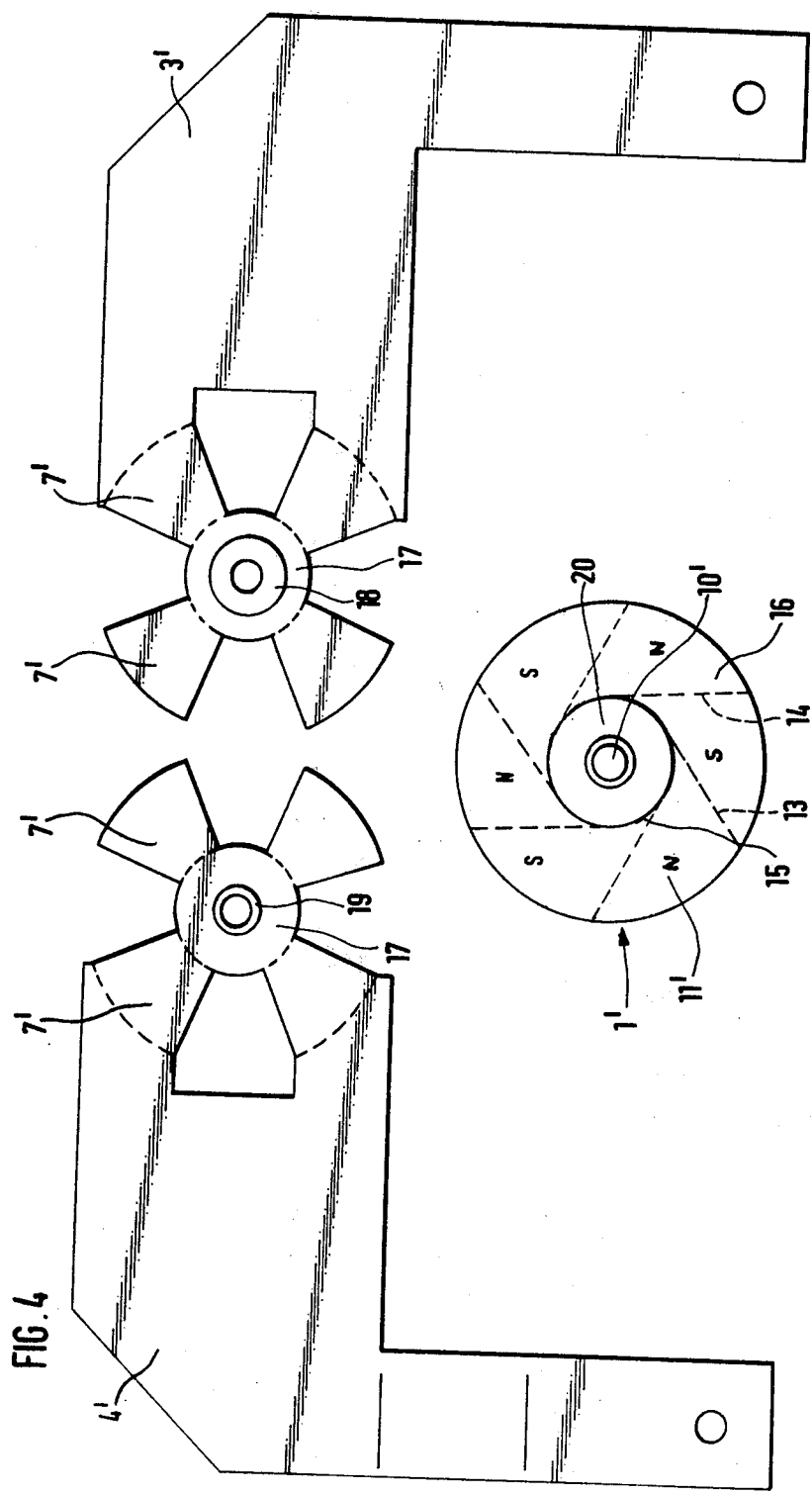

SINGLE PHASE STEPPING MOTOR, PARTICULARLY FOR CLOCKS

The invention relates to a single phase stepping motor, particularly for clocks, with a disc-like, axially magnetized rotor with a number of rotor poles and a stator, which stator is made of at least two stator parts connected with one another by means of a bridge part, the latter carrying the excitation winding, of which each stator part on its free end has a smaller number (in comparison to the number of rotor poles) of stator poles, the stator poles being directed toward a face side of the rotor.

Motors of this type have already been proposed, by which main poles are arranged on the free stator ends, which main poles are offset or staggered by the same angle with respect to one another, on each of the main poles of which there is formed or attached, a triangular projection serving as an auxiliary pole. The main- and auxiliary-poles which are located on one of the stator parts are thereby directed toward one of the face sides of the axially magnetized rotor and the main- and auxiliary-poles, which are located on the other stator part, are directed toward the other face side. Moreover motors of this type have been proposed, in which all main and auxiliary poles which are formed on the stator parts, are located in one plane and are directed toward a single face side of the rotor. Such type of motors have a small energy consumption, a high efficiency or performance and a small construction volume.

It has now been shown that with an optimization of the characteristics of these motors, an enlargement of the auxiliary poles which is desirable with respect to an increase in the rotational moment, often is not possible or is not to the required extent, since an increase of the construction volume of the motor which is caused thereby cannot be permitted for many fields of use, and particularly with the use of motors in small clockworks or clock movements.

It is one object of the invention to avoid these disadvantages.

It is another object of the invention to provide measures which permit an increase of the moment of rotation without increasing the construction volume with the motors of the introductory described type.

It is another object of the present invention to aid the solution of the above-mentioned objects in the manner that each rotor pole surface is formed asymmetrically, such that in the rest condition of the rotor (1, 1') a rotor pole with its main part lies in the range of a stator pole (7, 7') and with an edge part lies in the range of the following stator pole (7, 7').

By this asymmetrical formation of the rotor poles, a considerable increase of the rotational moment can be achieved without an increase of the constructional volume accompanying same. This is brought about in the manner that by the formation of the rotor poles in accordance with the present invention, rotor auxiliary poles arise on the rotor itself, which rotor auxiliary poles together with the auxiliary poles of the stator, produce a high moment of rotation. A particular advantage of the invention resides in that the realization of these measures causes only exceptionally small costs, since the magnetizing device for the rotor merely must be adjusted to the formation of the rotor poles in accordance with the present invention. A further particular advantage of the invention resides in that when an increase in the moment of rotation is not needed or is to be done without, the construction volume of the motor can be reduced, since a stator without auxiliary poles can be used and this stator can be obtained in a space conserving manner.

According to an advantageous embodiment form of the invention, the surface of each rotor pole is formed by means of each two lines (13, 14) of equal length, which lines tangentially contact a concentric reference circle (15), and the contact points of the lines (13, 14) on the reference circle (15) are uniformly distributed. A particularly strong increase in the moment of rotation may be achieved in the manner that the diameter of the reference circle (15) is smaller than that of the circumferential circle of the rotor.

With the above and other objects and advantages in view, the present invention will become more clearly understood in connection with the following detailed description of two preferred embodiments, when considered with the accompanying drawings, of which:

FIG. 3 is a plan view of another single phase stepping motor with a four pole stator and an six pole rotor; and FIG. 4 is a pulled apart illustration of the single phase stepping motor of FIG. 3 without the excitation coil; each in substantially enlarged illustration.

Figure 1:
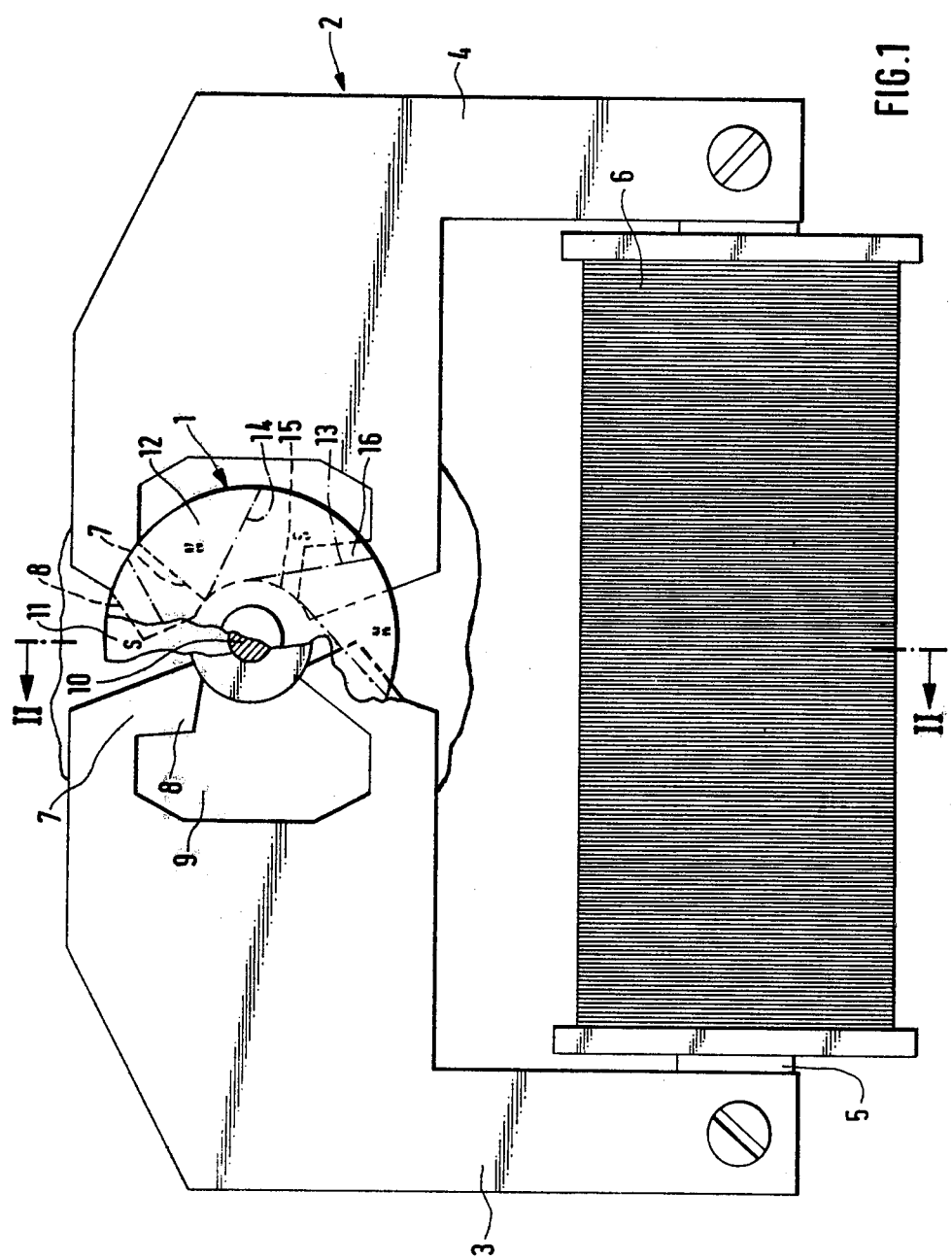
FIG. 1 is a plan view of a single phase stepping motor in accordance with the invention with a four pole stator and a six pole rotor.
Figure 2:
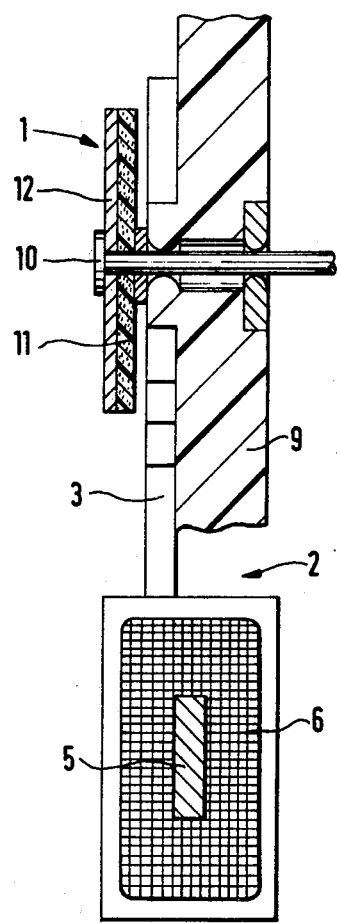
FIG. 2 is a longitudinal section through the single phase stepping motor according to FIG. 1 taken along line the II—II.

Referring now to the drawings, the single phase stepping motor according to FIGS. 1 and 2 comprises a six pole rotor 1 and a stator 2. The stator is made of two stator parts 3 and 4 as well as a bridge part 5 with an excitation coil 6, the bridge part 5 connecting both of these two stator parts 3 and 4 with one another.

Both stator parts 3 and 4 are arranged in one plane A, whereas the rotor 1 rotates in a plane B parallel thereto. Each stator part 3 and 4, respectively, possess two main poles 7 in the form of fingers which taper or narrow in a direction toward the rotor axis as well as triangularly-shaped auxiliary poles 8 which are formed or attached on the main poles. The points of the auxiliary poles point in a direction counter to the direction of rotation of the rotor 1. The free ends of the main poles 7 are supported on a bearing block 9. The rotor shaft 10 is rotatably mounted in this bearing block in a bore therein. The stator parts 3 and 4 each form a one-piece or integral unit, respectively, with the main poles 7 and auxiliary poles 8 which are associated therewith. Both units as well as the bridge part are produced by stamping out or punching out from a Hyperm-766 sheet metal.

The rotor 1 is made of a plastic-bonded permanent magnet disc 11; a samarium-cobalt alloy is used as the magnetic material with this disc 11. A flux return disc 12 is mounted on that face surface of the magnetic disc 11 which faces away from the stator 2. The return disc 12 is made of a soft magnetic material (or low retentive material) of low coercive force or retentivity. For the return disc, for example, the previously mentioned Hyperm can be used. Both discs 11 and 12 are forced or pressed on the rotor axle or shaft 10.

The permanent magnet disc 11 is axially magnetized, that means a south pole on one of the face sides of the rotor 1 stands opposite a north pole on the other face side of the rotor 1. Each of the individual pole surfaces is asymmetrically formed. The pole surfaces are each limited by two limit lines 13 and 14 of equal length, which lines are tangential to a concentric reference circle 15 and the points of contact of the lines on the reference circle are uniformly distributed on the reference circle 15. The points or tips 16 (defining an angle between the limit line and the circumferential edge of less than 90°) of the pole surfaces can be considered as rotor auxiliary poles 16, which rotor auxiliary poles 16 are aligned or point in the direction of rotation of the rotor 1.

The single phase motor according to FIGS. 3 and 4 is made of an six polar rotor 1' and a stator 2'. The stator is made of two stator parts 3' and 4' as well as a bridge part 5 with the excitation coil 6 thereon, the bridge part 5 connecting these two stator parts 3' and 4'. Each stator part 3' and 4', respectively, carries on that end thereof which is adjacent to the rotor 1', four circular annular sector shaped main poles 7'. On their inner circumferential boundary lines (indicated by the inner arcuate dashed lines in FIG. 4), these main poles 7' transfer into a ring 17. A bushing (or socket) 18 and 19, respectively, is seated in the respective rings 17, which bushings 18 and 19 serve for mounting of the rotor shaft 10' extending therebetween with the rotor 1' disposed between the aligned poles 7' of the respective stator parts 3' and 4', which are spaced parallel to each other. The stator parts 3' and 4', respectively, each form a one-piece unit with the main poles 7' which are associated with them. Moreover the rotor 1' is made of a plastic-bonded permanent magnetic disc 11'. A samarium-cobalt alloy is used with this disc as a magnetic material. The permanent magnet disc 11' is forced or pressed on a bushing or socket 20, which bushing forms a unit with the rotor shaft 10'. The mounting of the rotor with respect to the stator parts is similar to that of co-pending application Ser. No. 870,134, filed Jan. 17, 1978, hereby incorporated by reference.

As particularly evident from FIG. 4, moreover, each rotor pole surface is asymmetrically formed, whereby each surface is limited by two lines 13 and 14 of equal length.

These lines tangentially contact a concentric reference circle 15, the diameter of the reference circle being smaller than that of the circumferential circle of the rotor. The contact points are uniformly distributed on the reference circle 15.

In operation in the rest or unexcited condition of the excitation winding, the rotor 1, 1' is located in a position as illustrated in FIGS. 1 and 3, with a rotor pole with its main part lying adjacent to a stator pole 7 or 7', respectively, and with its auxiliary pole (edge part) 16 lying in the range of the following stator pole 7 or 7', respectively. In this position the magnetic resistance of the magnetic circuit is the smallest and the respective magnetic poles of the rotor are located in the maximized position over the stator poles 7, 7'.

In operation pulses are fed to the excitation coil 6 causing the rotor of the single phase stepping motor to undergo its stepwise movement. As soon as the stator 2 is excited by a pulse of current through the coil 6, the rotor 1, 1' is rotated by means of the stator auxiliary and/or main poles into a position in which the main parts of the rotor poles come to a new position lying maximized relative to the stator poles.

When the excitation pulse through the coil 6 terminates, the rotor continues to turn into the next rest position.

While there has been disclosed two embodiments of the invention, these embodiments are given by example only and not in a limiting sense.

What is claimed is:

1. A single phase stepping motor, particularly for clocks, comprising
    a rotor having a disc-like axially magnetized permanent magnet having face sides facing in axial directions and with a number of rotor poles,
    a stator made of at least two stator parts connected with one another via a bridge part carrying an excitation winding, each said stator part on its free end has a smaller number (in comparison to the number of rotor poles) of stator poles, said stator poles are axially spaced from, radially overlap and axially face toward one of the face sides of the permanent magnet,
    said permanent magnet is rotatably mounted relative to said stator defining a direction of rotation,
    said permanent magnet has asymmetrically magnetized pole areas on each said face side, each said areas is formed with a main part and an edge part,
    in the rest condition of the rotor a rotor pole with said main part is located in the range of a stator pole and with said edge part in the range of the following stator pole in the direction of rotation of the rotor.

2. The single phase stepping motor according to claim 1, wherein
    the surface of each rotor pole is formed by means of each two lines of equal length, said lines tangentially contact a concentric reference circle and define contact points of said lines on said reference circle which are uniformly distributed.

3. The single phase stepping motor according to claim 2, wherein
    said rotor defines a circumferential circle,
    the diameter of said reference circle is smaller than that of the circumferential circle of the rotor.

* * * * *